United States Patent [19]

Briggs et al.

[11] Patent Number: 5,475,630
[45] Date of Patent: Dec. 12, 1995

[54] METHOD AND APPARATUS FOR PERFORMING PRESCALED DIVISION

[75] Inventors: Willard S. Briggs; David W. Matula, both of Dallas, Tex.

[73] Assignee: Cyrix Corporation, Richardson, Tex.

[21] Appl. No.: 227,494

[22] Filed: Apr. 12, 1994

Related U.S. Application Data

[63] Continuation of Ser. No. 179,829, Dec. 22, 1993, abandoned, which is a continuation of Ser. No. 8,890, Jan. 25, 1993, abandoned, which is a continuation of Ser. No. 755,310, Sep. 5, 1991, abandoned.

[51] Int. Cl.$^6$ ........................................... G06F 7/52
[52] U.S. Cl. ........................................... 364/765
[58] Field of Search ........................... 364/761–766

[56] References Cited

U.S. PATENT DOCUMENTS

| | | | |
|---|---|---|---|
| 3,828,175 | 8/1974 | Amdahl et al. | 364/765 |
| 4,337,519 | 6/1982 | Nishimoto | 364/736 |
| 4,338,675 | 7/1982 | Palmer et al. | 364/748 |
| 4,707,798 | 11/1987 | Nakano | 364/765 |
| 4,725,974 | 2/1988 | Kanazawa | 364/765 |
| 4,991,132 | 2/1991 | Kadota | 364/765 |
| 5,020,017 | 5/1991 | Ooms et al. | 364/761 |
| 5,065,352 | 11/1991 | Nakano | 364/765 |

FOREIGN PATENT DOCUMENTS

| | | |
|---|---|---|
| 0149248 | 7/1985 | European Pat. Off. . |
| 0411491 | 6/1991 | European Pat. Off. . |

OTHER PUBLICATIONS

Atkins, Daniel E., "Higher Radix Division Using Estimates of the Divisor & Partial Remainders", IEEE–C17–925–934 (1968).

Bose, et al. "Fast Multiply & Divide for a VLSI Floating Point Unit", IEEE–1987–Dept. of EE & Comp. Sci., Univ. of Calif.–Berkeley.

Ercegovac, M. D., "A Higher–Radix Division with Simple Selection of Quoitient Digits", IEEE–1983–6th Symposium on Computer Arithmetic.

Ercegovac, M. D. et al., "A Division Algorithm with Prediction of Quotient Digits", IEEE—1985—Comp. Sci. Dept., Univ. of CA—LA, pp. 51–56.

Fandrianto, J. "Algorithm for High Speed Shared Radix 4 Division & Radix 4 Square Root," 1987—IEEE, pp. 73–79.

Ferrari, Domenico, "A Division Method Using a Parallel Multiplier," IEEE—1967–EC–16:224–226 (1967) pp. 191–193.

IEEE Std. 754—1985, "Standard for Binary Floating Point Arithmetic".

Coonen, J. T., "Specifications For A Proposed Standard For Floating Point Arithmetic", Memo UCB/ERLM78/72, 1978 UC at Berkeley.

Krishnamurthy, E. V., "On Range–Transformation Techniques For Division, IEEE Transactions on Computers", vol. 19, Feb. 1970.

Krishnamurthy, E. V., "A More Efficient Range Transformation Algorithm for Signed Digit Division", Int. J. Control, 12, 1970, pp. 73–79.

Nandi, et al. "A Simple Technique For Digital Division" Commun. ACM 10, 1967, pp. 299–301.

(List continued on next page.)

*Primary Examiner*—Roy N. Envall, Jr.
*Assistant Examiner*—Chuong D. Ngo
*Attorney, Agent, or Firm*—Andrew S. Viger; John L. Maxin

[57] ABSTRACT

An arithmetic circuit 10 for performing prescaled division uses a rectangular multiplier 16 and accumulator 30 operable to calculate a short reciprocal and scaled dividend and divisor to enable the sequential iterative calculation of large radix quotient digits. Each quotient digit can be calculated using a single pass through the rectangular multiplier 16 and accumulator 30 and can be accumulated to form a full precision quotient in a quotient register 36.

21 Claims, 3 Drawing Sheets

OTHER PUBLICATIONS

Parikh, Shrikant, "An Architecture For A Rational Arithmetic Unit.", 1988, Dissertation Pres. to Comp. Sci & Engineering.

Svoboda, Antonin, "An Algorithm For Division" Inf. Process. Mach. 9, 1963 pp. 25–32.

Taylor, George S., "Compatible Hardware For Division & Square Root," IEEE–1981–Comp. Sci. Div., U of CA, Berkeley.

Tung, Chin. "A Division Algorithm For Signed–Digit Arithmetic", IEEE Transactions on Computers vol. 17, 1970.

Wong, et al. "Fast Division Using Accurate Quotient Approximations" IEEE—1991, Comp. Sci Press.

Flynn, Michael, "On Division By Functional Iteration" IEEE, vol. C–19, No. 8, Aug. 1970.

C. V. Freiman et al., "Composite Division Unit", IBM Technical Disclosure Bulletin, vol. 9, No. 8, Jan. 1967 pp. 994–995.

METHOD AND APPARATUS FOR PERFORMING PRESCALED DIVISION

CROSS-REFERENCE TO RELATED APPLICATIONS

This patent is a continuation of a U.S. patent application Ser. No. 08/179,829 (now abandoned), which is a continuation of Ser. No. 08/008,890 (now abandoned), which is a continuation of Ser. No. 07/755,310 (now abandoned). The disclosures of U.S. Pat. Nos. 5,046,038 and 5,144,576, which are commonly assigned, are incorporated by reference.

TECHNICAL FIELD OF THE INVENTION

This invention relates in general to the field of electronic devices and more particularly to methods and systems operable to perform prescaled division.

BACKGROUND OF THE INVENTION

One of the chief concerns of modern day electronic digital system design is the ability to perform arithmetic functions accurately and quickly. One system for performing the division function is described in U.S. Pat. No. 5,046,038 entitled "METHOD AND APPARATUS FOR PERFORMING DIVISION USING A RECTANGULAR ASPECT RATIO MULTIPLIER" which issued on Sep. 3, 1991 and is assigned to the Assignee of the present invention, the disclosure of which is hereby incorporated by reference into the present application. The advantages attendant with the use of a rectangular aspect ratio multiplier circuit are described in the previously cited patent and in U.S Pat. No. 5,144,579 entitled which issued on Sep. 1, 1992 and is assigned to the assignee of the present application, the disclosure of which is hereby incorporated by reference into the present application.

Using the circuitries and methods described in the previously cited applications, the exact division function can be performed quickly and accurately in a minimal number of clock cycles compared to prior methods. The previously cited exact division methods return both a full precision quotient and a corresponding exact remainder using the rectangular aspect ratio multiplier and an iterative large radix division process. A full precision quotient denotes a partial quotient whose bit length is essentially the same as that of the dividend and divisor, with the possible augmentation by appropriate guard and round bits, and whose value differs from the infinitely precise quotient by less than one unit in the last place. As described in the previously cited applications, each successive large radix quotient digit calculation requires two multiplication steps thus employing two successive passes through the rectangular aspect ratio multiplier. For many applications, including the determination of rounded full precision quotients under a variety of prescribed infinitely precise roundings as specified in the IEEE/ANSI 754 and 854 floating point standards, it is sufficient to provide a sharp division function. The sharp division function returns a full precision quotient and the "sense" of the corresponding exact remainder. The sense of the corresponding exact remainder may be defined as an indicator denoting whether the exact remainder is strictly positive, zero, or strictly negative. For a sharp division function of this type, the clock cycle count for the entire operation can be greatly reduced using the techniques of prescaling of the operands in combination with the concept of a short reciprocal which is described fully in the previously cited U.S. Pat. Nos. 5,046,038 and 5,144,579. Previous teachings on prescaled division have prescribed its use for enhancing methods such as SRT division where two to four bits of the quotient are determined in each clock cycle using shift and add procedures. The prescaling method has also been described with regards to multiple precision arithmetic implemented in software, where a multiplicity of arithmetic operations must be performed in each iteration to effect the extension of the quotient by a unit length typically of the order of the machine word size.

Accordingly, a need has arisen for methods and circuits which are capable of performing large radix prescaled division operations to return the full precision quotient and the sense of the remainder in a minimum amount of clock cycles.

SUMMARY OF THE INVENTION

In accordance with the teachings of the present invention, methods and systems are described which substantially eliminate or reduce disadvantages and problems associated with prior art systems performing the division function.

Particularly, an arithmetic system is described which comprises circuitry for generating a short reciprocal of a divisor of a division operation. The system further comprises circuitry for prescaling the dividend and divisor by multiplying the dividend and divisor by the short reciprocal. Circuitry is then provided to iteratively calculate a sequence of large radix quotient digits, which, when accumulated, form the full precision quotient of the prescaled division operation, and indicate the sense of the corresponding exact remainder.

According to further embodiments of the present invention, rounding circuitry is provided to obtain from the full precision quotient and the sense of the remainder any of the infinitely precise directed rounded quotients specified in the IEEE/ANSI 754 and 854 standards.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
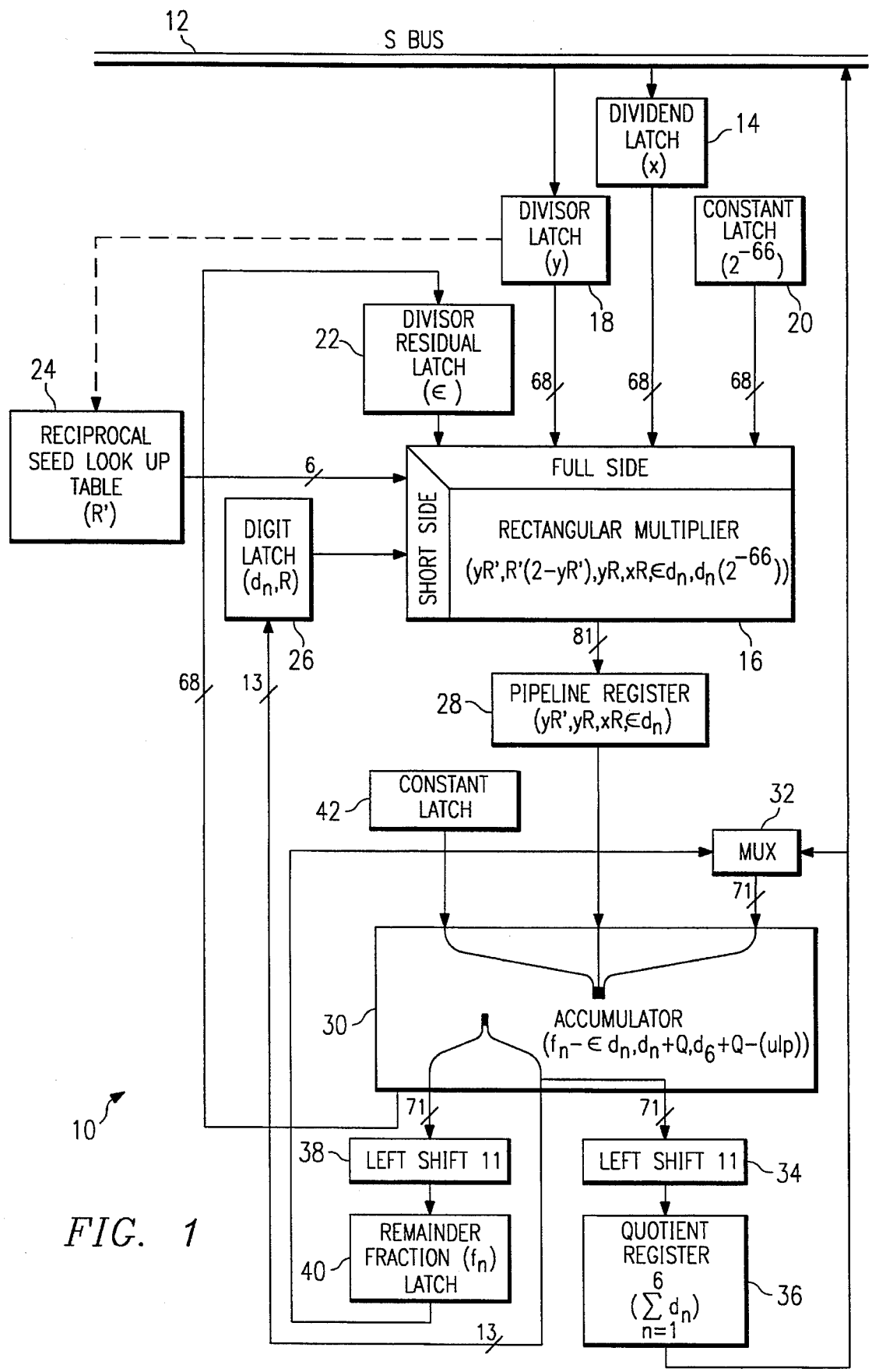
FIG. 1 is a schematic block diagram of a circuit capable of performing the prescaled division operation of the present invention.

Referring to FIG. 1, an arithmetic circuit 10 is shown coupled to a system bus 12. Arithmetic circuit 10 may comprise a portion of an arithmetic logic unit within a mathematics coprocessor or microprocessor within an integrated data processing system. For purposes of clarity, only the data paths are shown for arithmetic circuit 10. Suitable control signals are also routed to each of the constituent parts of arithmetic circuit 10 to provide for the operations which are described herein. These control signals may be supplied by techniques known in the art. Further, it should be understood that arithmetic circuit 10 is intended to be a portion of an integrated data processing system and communication to such an integrated system may be accomplished through suitable control signals and through system bus 12. Additional control signals and timing signals from the integrated system may also be supplied to arithmetic circuit 10 using known methods. For purposes of clarity in the description of the prescaled division method and system of the present invention, descriptive titles consistent with the role played by each of the circuits of arithmetic system 10 will be used. Also, for purposes of clarity, a consistent nomenclature with regard to the widths of data paths has attempted to be adopted herein. A "short" quantity indicates a numeric quantity on the order of thirteen bits in length for the particular embodiment illustrated in FIG. 1. A "full" size quantity indicates a number on the order of sixty-eight bits in length for the embodiment illustrated in FIG. 1. Similarly, a "long" quantity indicates a number on the order of the sum of the lengths of the short and full quantities which is eighty-one bits in length for the embodiment illustrated in FIG. 1. As described previously, the circuit of the present invention employs a rectangular aspect ratio multiplier circuit. The aspect ratio of the multiplier circuit, in general, is "short" by "full" and the multiplier is operable to output a "long" quantity which can be the exact product of its "short" and "full" inputs. It should be noted that the ratio of full to short quantities of about 6 to 1 described in this embodiment is for the purposes of teaching the present invention only and is not meant to limit the method of the present invention which is applicable to a wide range of ratios smaller and larger than 6 to 1.

While the method of prescaled division of the present invention will be described in detail with reference to FIG. 2, a general description of the method will aid in the understanding of the choice of systems selected to comprise arithmetic circuit 10. In general, the prescaled division method of the present invention forms the full precision quotient of a full precision dividend, x, by a full precision divisor, y. This is accomplished by first forming a short reciprocal, R, having a size of thirteen bits using a short reciprocal seed value, R'. The method successively forms a plurality of large radix digits of the full precision quotient by repeated passes through the arithmetic circuit 10. The large radix is of a size equal to the number of bits of the short quantity of the multiplier less a couple of guard bits, with the large radix being $2^{11}$ in the current embodiment. The plurality of large radix quotient digits iteratively generated by the method of the present invention is a number of quotient digits sufficient such that the product of this number of quotient digits and the number of bits in the large radix is comparable to the number of bits of the full quantity of the multiplier including several guard bits. In the present embodiment, six quotient digits are iteratively generated, yielding a sixty-six bit full precision quotient including guard and round bits.

The first step in the method is to scale both the dividend, x, and the divisor, y, by multiplying them by the short reciprocal, R. The scaled divisor forms a quantity that can be partitioned into most significant and least significant portions. The least significant portion is referred to herein as the divisor residual, $\epsilon$. It is a property of the short reciprocal that the product $Ry$, of the short reciprocal and the divisor is equal to the sum of unity and the divisor residual or $1+\epsilon$. The most significant portion following the previously described partition of the scaled divisor is exactly equal to one and has a length on the order of the number of bits in the large radix quotient digits while the divisor residual, $\epsilon$, has a length on the order of the full side of the rectangular aspect ratio multiplier circuit.

The scaled dividend forms a quantity which can be partitioned into most and least significant portions. The most significant portion comprises the first large radix digit of the quotient, $d_1$. The least significant portion will be referred to herein as the remainder fraction, $f_1$. As described, each large radix quotient digit, d, comprises eleven bits corresponding to the large radix $2^{11}$ while each remainder fraction, f, has a length on the order of the full side of the rectangular aspect ratio multiplier circuit.

The quantity $f_1 - \epsilon d_1$ is then calculated to yield a quantity which is the partitionable sum of the second quotient digit, $d_2$, and the second remainder fraction, $f_2$. In general, this process continues until six quotient digits are formed and accumulated. It is a property following from the choice of the short reciprocal and the quotient digit calculation procedure that the accumulated sum of quotient digits after each successive quotient digit accumulation is a partial quotient that differs from the infinitely precise quotient by less than one unit in the last place. As will be described herein, a scaled remainder is also generated, the sense of which is identical to the sense of the exact remainder of the full precision quotient of the divisor and dividend. The scaled remainder may thus be used to accomplish the various rounding operations specified by the IEEE/ANSI 754 and 854 standards. Accordingly, with a single multiplication step, a quotient digit of the full precision quotient is formed simultaneously with a fraction portion necessary to form the next successive quotient digit. As a result, after setting up the operation by calculating the short reciprocal and scaling the divisor and dividend, each large radix quotient digit of the full precision quotient may be calculated using a single multiplication operation. This results in a substantial increase in speed as measured by a decrease in clock cycle count over prior methods of performing the division operation.

Referring again to FIG. 1, a dividend latch 14 is shown which is operable to receive a full length or sixty-eight bit dividend, x, from the system bus 12 and input it into the full side of the rectangular multiplier 16. A divisor latch 18 is similarly operable to receive a full length divisor, y, from the system bus 12 and input it into the full side of the rectangular multiplier 16. A constant latch 20 is operable to input sixty-eight bit constants into the full side of rectangular multiplier 16. A divisor residual latch 22 is operable to store sixty-eight bit values of the divisor residual, $\epsilon$, and input $\epsilon$ into the full side of the rectangular multiplier 16. The divisor latch 18 is coupled to a reciprocal seed look up table 24 which is operable to store a large number of six bit reciprocal seed values, and output the reciprocal seed value associated with a particular divisor, y, responsive to the value of the divisor received from the divisor latch 18. The reciprocal seed look up table 24 is operable to retrieve the particular reciprocal seed value, R', required and output the six bit value into the short side of the rectangular multiplier 16.

A digit latch 26 is operable to store the successive quotient digit values, $d_n$, used in multiplications performed in the rectangular multiplier 16 and the value of the short reciprocal, R, used in the scaling of the divisor and dividend prior to the successive calculation of the quotient digits. The digit latch 26 is operable to store up to thirteen bit values and to output these values into the short side of the rectangular multiplier 16.

The rectangular multiplier 16 may be constructed using any number of conventional methods such that it is capable of forming a product of a thirteen bit number and a sixty-eight bit number to output an eighty-one bit product. The teachings of the present invention are equally applicable whether the rectangular multiplier 16 operates on numeric values in redundant, non-redundant, twos complement, or other comparable data formats. It should be understood that the presentation of the particular data path widths and the selection of any exemplary data storage format should not be construed to limit the teachings of the present invention to this or any particular embodiment. All these alternative embodiments are intended to be included within the scope and teachings of the present invention as defined by the appended claims.

An eighty-one bit product is output from the rectangular multiplier 16 into a pipeline register 28 operable to store the long eighty-one bit numeric value prior to being input into an accumulator 30. The accumulator 30 may comprise a three input adder circuit constructed according to known methods with the capability to selectively negate any of its inputs. As described previously, the accumulator 30 receives one of its inputs from pipeline register 28. An additional operand input into the accumulator 30 is received from a multiplexer 32 which inputs a seventy-one bit value into the accumulator 30. As described previously, the results of the operations used in the method of the present invention must at times be subdivided or partitioned into separate values. The accumulator 30 has the unique ability to output portions of the sum or difference it calculates or selectively output the entire value, depending upon the particular operation required by the method of the present invention. For example, accumulator 30 is operable to output a full length sixty-eight bit number to the divisor residual latch 22. The divisor residual is calculated by multiplying the divisor, y, by the short reciprocal, R, the product of which equals the value of $1+\epsilon$. The divisor residual, $\epsilon$, comprises the sixty-eight low order bits of the product of the divisor and the short reciprocal. Accordingly, accumulator 30 is operable to partition off the sixty-eight low order bits of the product and route these to the divisor residual latch 22 for use in later calculations.

Accumulator 30 is operable to output a 71 bit sum to a first shifter 34 which selectively shifts the sum left 11 bit positions. The selectively shifted quantity is then output from first shifter 34 into a quotient register 36 which is operable to store the accumulated quotient digits and to output the accumulated partial quotient value to one input of the multiplexer 32. This data path is used to present the accumulated partial quotient value to one input of accumulator 30 so that a successive quotient digit can be added to the accumulated partial quotient after the quotient digit has been shifted in rectangular multiplier 16 by being multiplied by the constant, $2^{-66}$, loaded from constant latch 20.

Accumulator 30 is also operable to perform the difference between the fraction portion and the product of $\epsilon$ and the prior calculated quotient digit or $f_n - \epsilon d_n$. The value of this difference is partitioned into a low order and a high order portion. The high order or most significant eleven bits of the difference $f_n - \epsilon d_n$ comprise the next quotient digit, $d_{n+1}$, and are routed to the digit latch 26.

The low order portion of the difference $f_n - \epsilon d_n$ formed in the accumulator 30 comprises the next remainder fraction, $f_{n+1}$, which is output from the accumulator 30 into a second shifter 38 which selectively shifts the quantity to the left eleven bit positions. The shifted quantity is then output from shifter 38 to a remainder fraction latch 40. The remainder fraction latch 40 is operable to output the shifted remainder fraction to an additional input of multiplexer 32. This data path allows the remainder fraction, f, to be routed into the accumulator 30 for the formation of the difference, $f_n - \epsilon d_n$, in a successive pass through the accumulator 30. The difference $f_n - \epsilon d_n$ comprises the scaled remainder of each iteration. The high and low order partitioned portions of the scaled remainder comprise short and full length quantities, respectively, corresponding to the lengths of the successive quotient digit, $d_{n+1}$ and the successive remainder fraction, $f_{n+1}$. The accumulated sum of the appropriately shifted quotient digits available at each iteration is defined as the partial quotient, Q. This quantity resides in the quotient register 36 and is updated each iteration.

For the exact division of the dividend, x, by the divisor, y, yielding the partial quotient, Q, and the exact remainder, r, the following identity holds:

$$x = Qy + r$$

The method of prescaled division of the present invention develops the identical partial quotient, Q, using the short reciprocal, R, with a scaled remainder, Rr, as obtained by multiplying the above identity in all terms by R to yield:

$$Rx = Q(Ry) + Rr$$

According to the characteristics of prescaled division, as the method of the present invention iteratively proceeds, the quantity $f_n - \epsilon d_n$ is always equal to the subsequent scaled remainder. Due to the two foregoing identities, it is important to observe that the sense of the scaled remainder, Rr, is always identical to the sense of r as the short reciprocal, R, is a positive quantity. As such, the characteristic of the remainder, r, being strictly positive, zero, or strictly negative, is not altered in the formation of the scaled remainder by the multiplication by the positive short reciprocal R. Thus, after a sufficient number of digits of the partial quotient Q are formed and accumulated to yield a full precision quotient as the sum of n quotient digits, a single additional cycle yielding the difference $f_n - \epsilon d_n$ is computed as a final scaled remainder and its sense determined. The sense of the final scaled remainder thereby specifies the sense of the exact remainder, r, of the division of x by y. The sense of the final scaled remainder may thus be output and used to accomplish the required modes of rounding as specified in the IEEE/ANSI 754 and 854 standards.

A third input of accumulator 30 is coupled to a second constant latch 42. Constant latch 42 is operable to input the constant 2 into the accumulator 30 during the formation of a difference necessary in the Newton-Raphson generation of the short reciprocal which will be described more fully with reference to FIG. 2. Constant latch 42 is also operable to generate a negative unit in the last place (ulp) which is used in the selective correction of the final full precision quotient Q.

Figure 2A:
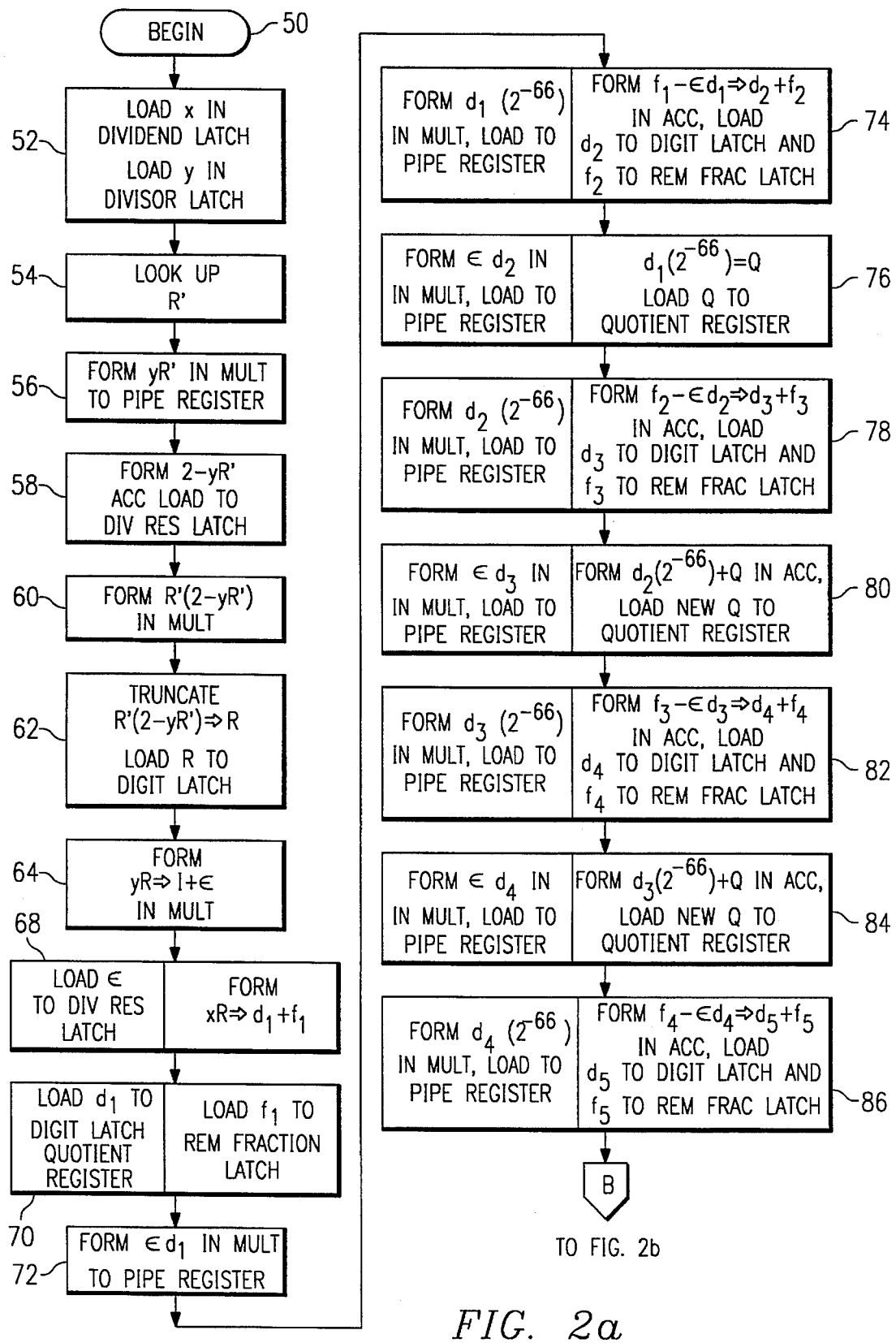
FIGS. 2a and 2b are a flow chart representation of the method of performing prescaled division using the teachings of the present invention.
Figure 2B:
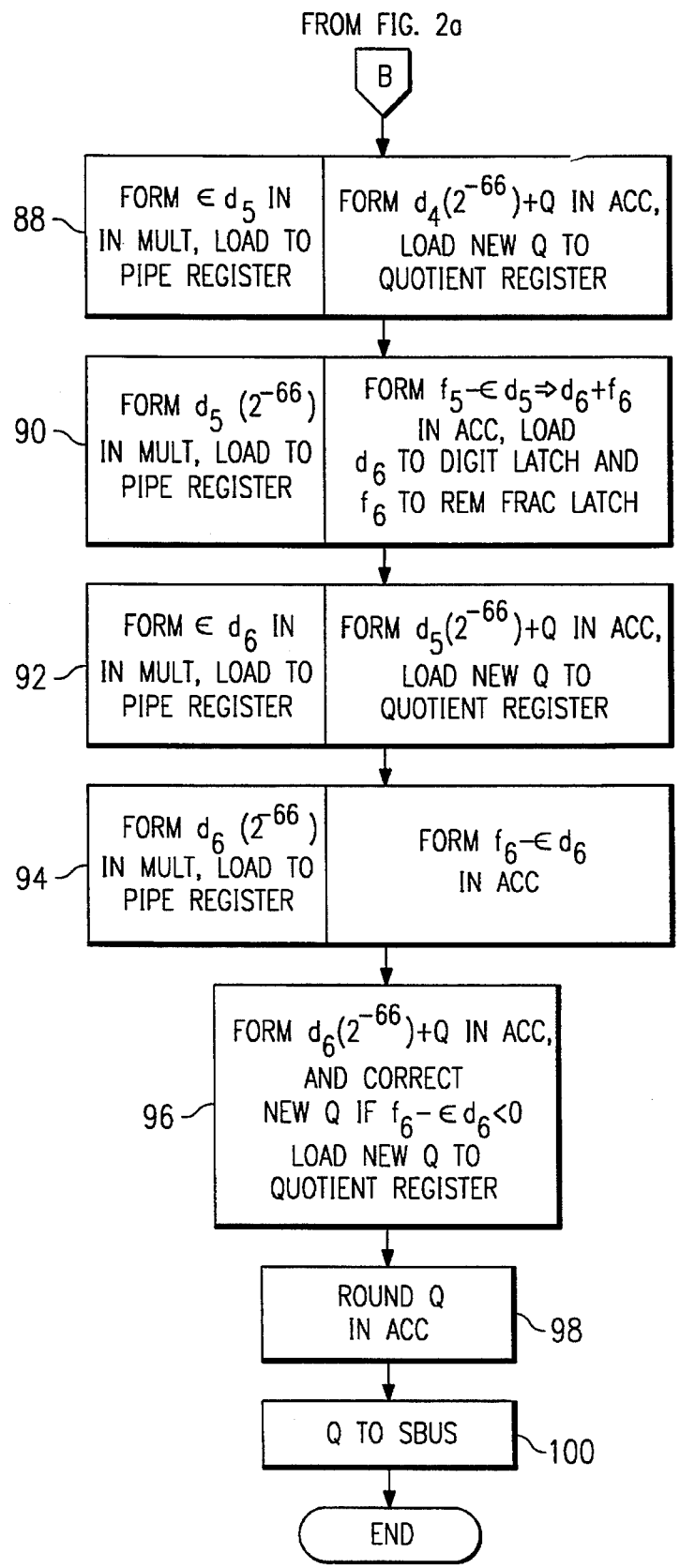

FIGS. 2a and 2b represent in flow chart form the series of steps used to perform the method of prescaled division according to the teachings of the present invention when utilizing the particular embodiment of arithmetic circuit 10 described with reference to FIG. 1. The method begins at step 50 and proceeds to step 52 where the dividend, x, is loaded from the system bus 12 into the dividend latch 14 and the divisor, y, is loaded from the system bus 12 into the divisor latch 18. The method then proceeds to step 54 where a particular reciprocal seed value, R', is located in the reciprocal seed look up table 24 and input into the short side of multiplier 16 responsive to the value of the divisor stored in divisor latch 18. The method then proceeds to step 56 where the multiplier 16 forms the product of the divisor and the reciprocal seed value equal to yR' and loads the eighty-one bit product into pipeline register 28.

The method then proceeds to step 58 where the accumulator 30 receives the product, yR', from the pipeline register 28 and the constant, 2, from constant latch 42 through multiplexer 32 and forms the difference, 2−yR'. The accumulator 30 then outputs the difference to the divisor residual latch 22. The method then proceeds to step 60 wherein the multiplier forms the product, R'(2−yR'), using the values from the reciprocal seed look up table 24 and the difference stored in the divisor residual latch 22. The product is passed through the pipeline register 28 and accumulator 30 and truncated as it is loaded into the digit latch 26 as shown in step 62 in FIG. 2a. The truncated value comprises the short reciprocal, R, which is used to scale the divisor and dividend.

The method proceeds to step 64 where the divisor is scaled by forming the product of the divisor, y, stored in the divisor latch 18 and the short reciprocal, R, stored in the digit latch 26. As described previously, the scaled divisor comprises the sum of 1 and the divisor residual, $\epsilon$. The scaled divisor, yR, is passed through the pipeline register 28 and the accumulator 30 where it is partitioned into high and low order portions. Upon leaving the accumulator 30, the low order portion constituting the divisor residual, $\epsilon$, is loaded into the divisor residual latch 22 as shown in step 68.

Simultaneously with the passage of the divisor residual, $\epsilon$, into the divisor residual latch 22, the multiplier 16 forms the product of the dividend, x, stored in the dividend latch 14 and the short reciprocal, R, stored in the digit latch 26 to complete the scaling of the dividend. It should be noted that the block indicated with the reference numeral "68" in FIG. 2a comprises two operations. These operations happen simultaneously within arithmetic circuit 10 and as such are referred to by a single step 68. The pipelined nature of arithmetic circuit 10 greatly contributes to its speed as operations can be simultaneously formed in the rectangular multiplier 16 and in the accumulator 30. Similar nomenclature will be used to describe the remaining steps in FIGS. 2a and 2b to indicate simultaneous operations.

The method proceeds at step 70 where the high order portion of the scaled dividend, xR, comprising the first quotient digit, $d_1$, is loaded into the digit latch 26 from accumulator 30. The low order portion of the scaled dividend, xR, comprising the first remainder fraction, $f_1$, is loaded into the remainder fraction latch 40 after passing from accumulator 30 through shifter 38.

Step 70 completes the setup operations of the method of the present invention which must occur prior to the successive calculation of the large radix quotient digits of the division of the divisor by the dividend. The setup operations, in general, comprise the calculation of the short reciprocal and the subsequent scaling of the divisor and dividend. The embodiment described herein utilizes a single Newton-Raphson iteration which utilizes a seed value, R', comprising six bits of the reciprocal of the divisor. It should be understood that this is merely one possible method of forming the short reciprocal and the selection of this method should not be construed to limit the teachings of the present invention to this or any particular method. For example, the short reciprocal could be acquired using multiple Newton-Raphson iterations. Further, the short reciprocal could be acquired using a direct table look up as long as the table was large enough to return a short reciprocal value having a sufficient number of accurate bits. Further, a direct table look up used in combination with either linear interpolation with a pair of table entries or nonlinear, polynomial-based interpolation with conventional curve-fitting algorithms and three or more table entries could also be used to increase the number of bits of accuracy for the retrieved short reciprocal.

The short reciprocal used in the method of the present invention is similar in properties to the short reciprocal described in U.S. Pat. No. 5,046,038 cited previously entitled "METHOD AND APPARATUS FOR PERFORMING DIVISION USING A RECTANGULAR ASPECT RATIO MULTIPLIER", which issued Sep. 3, 1991 and is assigned to the assignee of the present application, the disclosure of which is hereby incorporated by reference into the present application. As stated therein, the short reciprocal must be sufficiently accurate and either exactly equal to or slightly larger than the actual value of the reciprocal of the divisor such that as each quotient digit is calculated and accumulated into the partial quotient, the partial quotient is either exactly equal to the value of the truncated infinitely precise value of the quotient or is greater than the truncated infinitely precise value of the quotient by one unit in the last place of the partial quotient. Because of this property of the accumulated partial quotient values, any inaccuracy in the partial quotient value can be corrected during the calculation of subsequent quotient digits. For example, if a partial quotient did comprise an error of one unit in the last place of the partial quotient, the successive quotient digit would be of opposite sign, resulting in a correction of the overall accumulated value of the new partial quotient. Accordingly, as the successive quotient digits are accumulated, the infinitely precise value of the quotient can be iteratively calculated to any required number of bits of accuracy. The method of the present invention will be described with reference to the calculation of six eleven-bit quotient digits and the determination of the sense of the corresponding exact remainder. There is no theoretical limit to the potential number of bits which may be calculated once the method of the present invention has been properly initiated.

The method of the present invention begins the formation of the successive quotient digits at step 72 where the product of the divisor residual, $\epsilon$, and the first quotient digit, $d_1$, is formed in multiplier 16 and is loaded into the pipeline register 28.

The method proceeds to step 74 where calculations are simultaneously performed in multiplier 16 and accumulator 30. The multiplier 16 forms the product of the quotient digit, $d_1$, stored in digit latch 26 and the constant, $2^{-66}$, retrieved from constant latch 20. This product is then loaded into pipeline register 28. Simultaneously, the accumulator 30 forms the difference of the remainder fraction, $f_1$, and the product of the divisor residual, $\epsilon$, and the quotient digit, $d_1$, which was previously loaded into pipeline register 28. The difference, $f_1-\epsilon d_1$, is a long quantity which may be partitioned into a high order portion comprising the next quotient digit, $d_2$, and a low order portion comprising the next remainder fraction, $f_2$. The next quotient digit, $d_2$, is partitioned off by accumulator 30 and is loaded into the digit latch 26. Numerically, it follows that $f_1-\epsilon d_1$ is equal to the sum $d_2+f_2$. The next remainder fraction, $f_2$, is similarly partitioned off by accumulator 30 and loaded into the remainder fraction latch 40 after being shifted left eleven places in shifter 38.

The method then proceeds to step 76 where calculations are simultaneously performed in the multiplier 16 and the accumulator 30. The multiplier 16 forms the product of the divisor residual, $\epsilon$, and the last quotient digit calculated, $d_2$, and loads the product into the pipeline register 28. Simultaneously, the product of the quotient digit, $d_1$, and the constant, $2^{-66}$, resident in pipeline register 28 which comprises the first partial quotient, Q, is passed through accumulator 30 and loaded into the quotient register 36 after being shifted left by eleven places in shifter 34.

The method proceeds to step 78 where calculations are simultaneously performed in multiplier 16 and accumulator

30. The multiplier 16 forms the product of the quotient digit, $d_2$, stored in digit latch 26 and the constant, $2^{-66}$, retrieved from constant latch 20. This product is then loaded into pipeline register 28. Simultaneously, the accumulator 30 forms the difference of the remainder fraction, $f_2$, and the product of the divisor residual, $\epsilon$, and the quotient digit, $d_2$, which was previously loaded into pipeline register 28. The difference, $f_2-\epsilon d_2$, is partitioned so as to be equal to the sum of the next quotient digit, $d_3$, and the next remainder fraction, $f_3$. The next quotient digit, $d_3$, is partitioned off by accumulator 30 and is loaded into the digit latch 26. The next remainder fraction, $f_3$, is similarly partitioned off by accumulator 30 and loaded into the remainder fraction latch 40 after being shifted left eleven places in shifter 38.

The method then proceeds to step 80 where calculations are simultaneously performed in the multiplier 16 and the accumulator 30. The multiplier 16 forms the product of the divisor residual, $\epsilon$, and the last quotient digit calculated, $d_3$, and loads the product into the pipeline register 28. Simultaneously, the product of the quotient digit, $d_2$, and the constant, $2^{-66}$, resident in pipeline register 28 is added to the first partial quotient, Q, in accumulator 30 obtained through multiplexer 32 and the sum comprising the new partial quotient, Q, is loaded into the quotient register 36 after being shifted left by eleven places in shifter 34.

The method proceeds to step 82 where calculations are simultaneously performed in multiplier 16 and accumulator 30. The multiplier 16 forms the product of the quotient digit, $d_3$, stored in digit latch 26 and the constant $2^{-66}$, retrieved from constant latch 20. This product is then loaded into pipeline register 28. Simultaneously, the accumulator 30 forms the difference of the remainder fraction, $f_3$, and the product of the divisor residual, $\epsilon$, and the quotient digit, $d_3$, which was previously loaded into pipeline register 28. The difference, $f_3-\epsilon d_3$, is partitioned so as to be equal to the sum of the next quotient digit, $d_4$, and the next remainder fraction, $f_4$. The next quotient digit, $d_4$, is partitioned off by accumulator 30 and is loaded into the digit latch 26. The next remainder fraction, $f_4$, is similarly partitioned off by accumulator 30 and loaded into the remainder fraction latch 40 after being shifted left eleven places in shifter 38.

The method then proceeds to step 84 where calculations are simultaneously performed in the multiplier 16 and the accumulator 30. The multiplier 16 forms the product of the divisor residual, $\epsilon$, and the last quotient digit calculated, $d_4$, and loads the product into the pipeline register 28. Simultaneously, the product of the quotient digit, $d_3$, and the constant, $2^{-66}$, resident in pipeline register 28 is added to the current partial quotient, Q, in accumulator 30 and the sum comprising the new partial quotient, Q, is loaded into the quotient register 36 after being shifted left by eleven places in shifter 34.

The method proceeds to step 86 where calculations are simultaneously performed in multiplier 16 and accumulator 30. The multiplier 16 forms the product of the quotient digit, $d_4$, stored in digit latch 26 and the constant $2^{-66}$ retrieved from constant latch 20. This product is then loaded into pipeline register 28. Simultaneously, the accumulator 30 forms the difference of the remainder fraction, $f_4$, and the product of the divisor residual, $\epsilon$, and the quotient digit, $d_4$, which was previously loaded into pipeline register 28. The difference, $f_4-\epsilon d_4$, is partitioned so as to be equal to the sum of the next quotient digit, $d_5$, and the next remainder fraction, $f_5$. The next quotient digit, $d_5$, is partitioned off by accumulator 30 and is loaded into the digit latch 26. The next remainder fraction, $f_5$, is similarly partitioned off by accumulator 30 and loaded into the remainder fraction latch 40 after being shifted left eleven places in shifter 38.

Referring now to FIG. 2b, the method then proceeds to step 88 where calculations are simultaneously performed in the multiplier 16 and the accumulator 30. The multiplier 16 forms the product of the divisor residual, $\epsilon$, and the last quotient digit calculated, $d_5$, and loads the product into the pipeline register 28. Simultaneously, the product of the quotient digit, $d_4$, and the constant, $2^{-66}$, resident in pipeline register 28 is added to the current partial quotient, Q, in accumulator 30 and the sum comprising the new partial quotient, Q, is loaded into the quotient register 36 after being shifted left by eleven places in shifter 34.

The method proceeds to step 90 where calculations are simultaneously performed in multiplier 16 and accumulator 30. The multiplier 16 forms the product of the quotient digit, $d_5$, stored in digit latch 26 and the constant $2^{-66}$, retrieved from constant latch 20. This product is then loaded into pipeline register 28. Simultaneously, the accumulator 30 forms the difference of the remainder fraction, $f_5$, and the product of the divisor residual, $\epsilon$, and the quotient digit, $d_5$, which was previously loaded into pipeline register 28. The difference, $f_5-\epsilon d_5$, is partitioned so as to be equal to the sum of the next quotient digit, $d_6$, and the next remainder fraction, $f_6$. The next quotient digit, $d_6$, is partitioned off by accumulator 30 and is loaded into the digit latch 26. The next remainder fraction, $f_6$, is similarly partitioned off by accumulator 30 and loaded into the remainder fraction latch 40 after being shifted left eleven places in shifter 38.

The method then proceeds to step 92 where calculations are simultaneously performed in the multiplier 16 and the accumulator 30. The multiplier 16 forms the product of the divisor residual, $\epsilon$, and the last quotient digit calculated, $d_6$, and loads the product into the pipeline register 28. Simultaneously, the product of the quotient digit, $d_5$, and the constant, $2^{-66}$, resident in pipeline register 28 is added to the current partial quotient, Q, in accumulator 30 and the sum comprising the new partial quotient, Q, is loaded into the quotient register 36 after being shifted left eleven places in shifter 34.

The method proceeds to step 94 where calculations are simultaneously performed in multiplier 16 and accumulator 30. The multiplier 16 forms the product of the quotient digit, $d_6$, stored in digit latch 26 and the constant $2^{-66}$, retrieved from constant latch 20. This product is then loaded into pipeline register 28. Simultaneously, the accumulator 30 forms the difference of the remainder fraction, $f_6$, and the product of the divisor residual, $\epsilon$, and the quotient digit, $d_6$, which was previously loaded into pipeline register 28. At this point, the computed difference, $f_6-\epsilon d_6$, is viewed as the final scaled remainder and its sense is determined.

As taught by Coonan in "Specifications for a Proposed Standard for Floating Point Arithmetic", Report No. UCB/ERL M78/72 of the Electronics Research Laboratory, University of California, Berkeley, Oct. 13, 1978, it is sufficient for all modes of infinitely precise rounding to return a full precision quotient, incorporating a guard bit and a round bit, along with an indicator specifying whether or not the result is exact to the length of the result including the guard and round bits. A novel procedure is included in the present system and method where the sense of the final scaled remainder indicates the procedure for obtaining the full precision quotient and guard, round and indicator bits. In step 96, if the sense is zero, the indicator is set to zero and the shifted quotient digit, $d_6$ ($2^{-66}$) is added to the partial quotient, Q, in accumulator 30. The result of this addition comprises the full precision quotient with the required guard and round bits. This quantity is passed through shifter 34 and is loaded into quotient register 36 where it is available to the remaining system through system bus 12.

If the sense of the remainder is non-zero, the indicator is set to one and the partial quotient is conditionally corrected when the sense is strictly negative during the addition of the shifted quotient digit, $d_6$ ($2^{-66}$) and the partial quotient in accumulator 30. This correction is accomplished by adding a negative unit in the last place (ulp) received from constant latch 42 during the addition of the shifted quotient digit $d_6$ ($2^{-66}$) and the partial quotient. If the sense of the scaled remainder is positive, no such correction is required during the addition of the shifted quotient digit $d_6$. The full precision, selectively corrected quotient including the required guard and round bits is then passed through shifter 34 and is loaded into quotient register 36 where it is available to the remaining system through system bus 12. The final full precision quotient is passed through shifter 34 without being shifted. The indicator bit is also available to the remaining system through the setting of a suitable status flag using a control signal output by accumulator 30.

An additional advantage of the present invention inheres in step 98 where accumulator 30 may be used to accomplish any required roundings due to the inclusion of a data path coupling quotient register 36 and the input of accumulator 30 through multiplexer 32. Additional logic and control signals are associated with accumulator 30 to accomplish tile various IEEE/ANSI roundings using the full precision quotient with guard and round bits present in quotient register 36 and the indicator bit set previously responsive to the sense of the final scaled remainder. After rounding operations are completed by accumulator 30 in step 100, the rounded quotient may be passed through shifter 34 unchanged and loaded into quotient register 36 where the rounded result is available to the remaining system through system bus 12.

Accordingly, a method and system for performing the division operation are disclosed which allow for the calculation of successive eleven bit quotient digits on each pass through a multiplier circuit following calculation of a short reciprocal and prescaling of the divisor and dividend operands. The system of the present invention comprises a pipeline configuration utilizing a multiplier and a unique accumulator circuit able to partition its sums and route the partitioned values to inputs of the multiplier or the accumulator.

Although the present invention has been described in detail, it should be understood that various changes, substitutions, and alterations can be made without departing from the spirit and scope of the invention as defined by the appended claims.

What is claimed is:

1. In a numeric processor, circuitry for dividing a dividend by a divisor to yield a rounded quotient selectively rounded by a rounding mode, comprising:

(a) circuitry receiving the divisor that generates an approximate reciprocal of the divisor;

(b) circuitry, including multiplication circuitry and addition circuitry, coupled to receive the divisor and the approximate reciprocal, that (i) scales the divisor by multiplying by the approximate reciprocal in the multiplication circuitry to yield a first product, and (ii) partitions the first product into a term of value unity and a divisor residual ($\epsilon$);

(c) circuitry, including the multiplication circuitry and the addition circuitry, coupled to receive the dividend and the approximate reciprocal, that (i) scales the dividend by multiplying by the approximate reciprocal in the multiplication circuitry to yield a second product, and (ii) partitions the second product into a first quotient digit ($d_1$) and a first remainder fraction ($f_1$);

(d) circuitry, including the multiplication circuitry and the addition circuitry, coupled to receive the divisor residual ($\epsilon$), a preceding quotient digit ($d_n$), and a preceding remainder fraction ($f_n$), that (i) generates, for each quotient digit and remainder fraction pair ($d_n$, $f_n$), a successor quotient digit and remainder fraction pair ($d_{n+1}$, $f_{n+1}$) by performing multiplication and subtraction operations, in the multiplication circuitry and the addition circuitry, to yield a product-sum ($f_n - \epsilon d_n$), and (ii) partitions the product-sum into the successor quotient digit and remainder fraction pair ($d_{n+1}$, $f_{n+1}$);

(e) circuitry that (i) receives the first quotient digit ($d_1$) and a predetermined number of the successor quotient digits, and (ii) accumulates the quotient digits into a full precision quotient;

(f) circuitry, including the multiplication circuitry and the addition circuitry, coupled to receive the divisor residual ($\epsilon$) and a final quotient digit and remainder fraction pair ($d_F$, $f_F$), that generates a sense control signal corresponding to a sense of a final product-sum ($f_F - \epsilon d_F$) associated with the full precision quotient, by performing multiplication and subtraction operations, in the multiplication circuitry and the addition circuitry, to yield the final product-sum ($f_F - \epsilon d_F$) and then determines the sense of the final product-sum, wherein a determined sense of zero indicates that the full precision precision quotient is infinitely precise, and a determined sense of positive or negative respectively indicates that the full precision quotient is smaller or larger than an infinitely precise quotient by less than one unit in its last place; and (g) rounding circuitry, responsive to the sense control signal, that generates the rounded quotient according to the rounding mode from the full precision quotient.

2. The circuitry of claim 1 wherein the multiplication circuitry comprises a rectangular aspect ratio multiplier with a full size multiplicand input and a short size multiplier input, wherein the divisor residual ($\epsilon$) comprises a number of bits substantially equal to the number of bits of the divisor, and is operable to be input to the full size multiplicand input of the rectangular aspect ratio multiplier.

3. The circuitry of claim 2 wherein the approximate reciprocal comprises a short reciprocal, and wherein the short reciprocal is operable to be input to the short size multiplier input of the rectangular aspect ratio multiplier.

4. The circuitry of claim 1 wherein the circuitry in element (e) comprises an accumulator with first and second inputs and first and second outputs, and a pipeline register coupled to an output of the multiplication circuitry and the first input of the accumulator, the pipeline register operable to store products output by the multiplication circuitry.

5. The circuitry of claim 4 further comprising:

a multiplexer comprising first and second inputs and an output, said output of said multiplexer coupled to said second input of said accumulator;

a first data path coupling said first output of said accumulator to said first input of said multiplexer; and a second data path coupling said second output of said accumulator to said second input of said multiplexer, said multiplexer operable to selectively input quantities output from said first and second outputs of said accumulator into said second input of said accumulator.

6. The circuitry of claim 1 wherein the circuitry in element (a) comprises:

look up table circuitry that stores a plurality of reciprocal seed values;

circuitry, coupled to the look up table circuitry that selects a single reciprocal seed value from the reciprocal seed values responsive to the value of the divisor;

circuitry, including the multiplication circuitry and the addition circuitry, coupled to the circuitry that selects the single reciprocal seed value, that generates the approximate reciprocal as a function of the single reciprocal seed value and the divisor.

7. The circuitry of claim 1 wherein said circuitry in element (a) further comprises truncating circuitry operable to select a plurality of leading bits of said approximate reciprocal to form a short reciprocal, said plurality of leading bits being equal to the number of bits in said quotient digits plus at least one guard bit.

8. The circuitry of claim 7, wherein said short reciprocal comprises the number of bits in said quotient digits plus two guard bits.

9. The circuitry of claim 1 further comprising circuitry, coupled to the circuitry of elements (e) and (f) to receive the full precision quotient and the sense control signal, that generates a corrected full precision quotient according to the sense control signal, a sense that is nonzero indicating the status of the corrected full precision quotient as smaller than the infinitely precise quotient by less than one unit in its last place.

10. The circuitry of claim 9, wherein the sense control signal is used to set an indicator bit associated with the corrected full precision quotient, and wherein the predetermined number of successive additional quotient digits is chosen so that the corrected quotient includes a guard and a round bit.

11. The circuitry of claim 1 wherein the selectable rounding modes are up, down, nearest, and toward zero.

12. The circuitry of claim 1, wherein the multiplication circuitry comprises a multiplier than performs the multiplication operations and wherein the addition circuitry comprises an accumulator that performs the subtraction operations.

13. The circuitry of claim 1 wherein the multiplication and the addition circuitry are independent circuitry having a pipelined architecture.

14. The circuitry of claim 1 wherein said addition circuitry and said multiplication circuitry is a multiplier core having multiplicand, multiplier, and adder inputs to support product-sum operations within said multiplier core.

15. A method for dividing a dividend by a divisor to yield a selectively rounded quotient of substantially m bits, the method being performed using a rectangular aspect ratio multiplier having a short size input of substantially k multiplier bits and a full size input of substantially m multiplicand bits and addition circuitry, comprising the steps:

(a) generating a short reciprocal of substantially k bits corresponding to a short reciprocal of the divisor;

(b) scaling the divisor to generate a divisor residual ($\epsilon$) of substantially m bits, by multiplying, in the multiplier, the divisor by the short reciprocal to generate a first product, and partitioning the first product into a term of value unity and the divisor residual ($\epsilon$);

(c) scaling the dividend to generate a first quotient digit ($d_1$) of substantially k bits and a first remainder fraction ($f_1$) of substantially m bits, by multiplying, in the multiplier, the dividend by the short reciprocal to generate a second product, and partitioning the second product into the first quotient digit ($d_1$) and the remainder fraction ($f_1$);

(d) generating successor quotient digit and remainder fraction pairs ($d_{n+1}$, $f_{n+1}$) by performing multiplication and subtraction operations, in the multiplier and the addition circuitry, with a preceding quotient digit ($d_n$), a preceding remainder fraction ($f_n$), and the divisor residual($\epsilon$) to obtain a product-sum $f_n - \epsilon d_n$), and partitioning the product-sum into the successor quotient digit ($d_{n+1}$) and the successor remainder fraction ($f_{n+1}$);

(e) accumulating the first quotient digit ($d_1$), and a predetermined number of the successor quotient digits into a full precision quotient;

(f) from a final successor quotient digit ($d_F$) and a final successor remainder fraction ($f_F$), generating a sense control signal corresponding to a sense of a final product-sum ($f_F - \epsilon d_F$) associated with the full precision quotient by performing multiplication and subtraction operations, in the multiplier and addition circuitry, to obtain the final product sum, the sense control signal being generated such that the final product-sum having a sense of zero indicates that the full precision quotient is infinitely precise, and the final product-sum having a sense that is positive or negative respectively indicates that the full precision quotient is smaller or larger than the infinitely precise quotient by less than one unit in its last place; and (g) responsive to the sense control signal, generating the selectively rounded quotient of substantially m bits from the full precision quotient according to a one of a plurality of selectable rounding modes.

16. The method of claim 15 wherein step (a) comprises the substeps of (i) obtaining from a look up table a reciprocal seed value, (ii) generating, using the multiplier, an approximate reciprocal from such reciprocal seed value, and (iii) truncating a selected number of least significant bits of said approximate reciprocal to form the short reciprocal indication corresponding in length to the number of bits in said quotient digits plus at least one guard bit.

17. The method of claim 16 wherein said short reciprocal comprises the number of bits in said quotient digits plus two guard bits.

18. A method of dividing a dividend by a divisor to yield a partial quotient of substantially m bits, the method being performed using a rectangular aspect ratio multiplier having a short size input of substantially k multiplier bits and a full size input of substantially m multiplicand bits and addition circuitry, comprising the steps:

(a) generating a short reciprocal of substantially k bits corresponding to a short reciprocal of the divisor;

(b) scaling the divisor to generate a divisor residual of substantially m bits, by multiplying in the multiplier, the divisor by the short reciprocal to generate a first product, and partitioning the first product into a term of value unity and the divisor residual;

(c) scaling the dividend to generate a first quotient digit of substantially k bits corresponding to the short size input of the multiplier, and an associated remainder fraction of substantially m bits corresponding to the full size input of the multiplier, by multiplying in the multiplier the dividend by the short reciprocal to generate a second product having substantially m+k bits, and partitioning the second product into the first quotient digit of substantially k bits and the remainder fraction of substantially m bits;

(d) in each of a predetermined number of passes through the multiplier and addition circuitry, calculating a successive quotient digit of substantially k bits of the partial quotient, corresponding to the short size input of the multiplier, and an associated remainder fraction of substantially m bits corresponding to the full size input of the multiplier, by generating and partitioning a product sum equal to a result of subtracting from a preceding remainder fraction the product of a respective preceding quotient digit and the divisor residual; and (e) for each pass through the multiplier, accumulating the corresponding quotient digit to yield a partial quotient;

(f) said predetermined number of passes being determined by a ratio m to k, corresponding to the ratio of the number of bits of the full size input to the number of bits of the short size input of the multiplier;

(g) whereby increasing the size of the multiplier as measured by an increase in the number of bits in the short size input of the multiplier is associated with a decrease in the execution time of division as measured by a decrease in the number of passes through the multiplier.

19. The method of claim 18 further comprising the steps of:

(h) in a final pass through the multiplier, generating a sense control signal corresponding to a sense of a remainder associated with the partial quotient of substantially m bits from a final one of the quotient digits and associated remainder fractions, and the divisor residual, by generating a product sum, the product sum equal to the result of subtractin from the final remainder fraction the product of the final quotient digit and the divisor residual to obtain the remainder, the sense control signal being generated such that the remainder having a sense of zero indicates that the partial quotient is infinitely precise, and the remainder having a sense that is positive or negative respectively indicates that the partial quotient is smaller or larger than the infinitely precise quotient by less than one unit in its last place; and (i) responsive to the sense control signal, generating a rounded quotient from the partial quotient according to one of a plurality of selectable rounding modes.

20. A circuit for performing division of a dividend by a divisor, using a short reciprocal for prescaling the divisor to obtain a divisor residual, and iteratively outputting successive multiple bit portions of a partial quotient having an undefined length, the circuit comprising:

(a) calculation circuitry, including a multiplier, that prescales the dividend to obtain a first product-sum comprising a quotient digit having more than eight bits and a remainder fraction by multiplying the short reciprocal and the dividend in a single pass through the calculation circuitry, and to output the quotient digit;

(b) the short reciprocal having a number of bits comparable to the number of bits of the quotient digit;

(c) calculation circuitry, including the multiplier and the addition circuitry, that iteratively generates at least one subsequent product-sum comprising a subsequent quotient digit having more than eight bits and a subsequent remainder fraction, the at least one subsequent product-sum being generated by the addition circuitry and the multiplier, wherein the at least one subsequent product sum equals a result of subtracting from a preceding remainder fraction the product of a respective preceding quotient digit and the divisor residual, the product sum being computed in a single pass through the calculation circuitry, and for outputting the subsequent quotient digit; and (d) circuitry for accumulating the first quotient digit and the at least one subsequent quotient digits into the partial quotient wherein the length of the partial quotient increases by more than eight bits on each pass through the calculation circuitry.

21. The circuit of claim 20, wherein the multiplier circuit comprises a rectangular aspect ratio multiplier circuit comprising a full size multiplicand input and a short size multiplier input and wherein the short reciprocal is operable to be input to the short size multiplier input of said rectangular aspect ratio multiplier circuit.

* * * * *